United States Patent [19]

Eby et al.

[11] 4,183,987

[45] Jan. 15, 1980

[54] KERFED EDGE GYPSUM BOARD HAVING IMPROVED EDGE STRENGTH

[75] Inventors: Lawrence T. Eby, Arlington Heights, Ill.; Nels Nelsson, New Port Richey, Fla.

[73] Assignee: United States Gypsum Company, Chicago, Ill.

[21] Appl. No.: 922,881

[22] Filed: Jul. 7, 1978

[51] Int. Cl.$^{2}$ .......................... B32B 31/18; E04C 2/04

[52] U.S. Cl. ...................................... 428/192; 156/45; 156/268; 52/586; 52/596; 52/779; 83/53

[58] Field of Search ................. 156/45, 257, 258, 268; 83/53, 177; 264/500, 504, 139; 52/586, 596, 779

[56] References Cited

U.S. PATENT DOCUMENTS

| | | | |
|---|---|---|---|
| 442,878 | 12/1890 | Geiger | 90/1 |
| 520,851 | 6/1894 | Kampfe et al. | 69/17 |
| 1,949,692 | 3/1934 | Pavesi | 52/600 |
| 2,587,243 | 2/1952 | Sweetman | 102/24 HC |
| 2,823,433 | 2/1958 | Kendall | 52/589 |
| 2,881,503 | 4/1959 | Johnson | 264/157 |
| 3,245,136 | 4/1966 | Taylor | 299/650 |
| 3,245,721 | 4/1966 | Margiloff | 299/14 |
| 3,524,367 | 8/1970 | Franz | 83/53 |
| 3,526,162 | 9/1970 | Willcox | 83/16 |
| 3,532,014 | 10/1970 | Franz | 83/53 |
| 3,791,014 | 2/1974 | Perna | 83/5 X |
| 3,849,235 | 11/1974 | Gwynne | 161/44 |
| 3,924,495 | 12/1975 | Der Marderosian et al. | 83/5 |
| 3,924,496 | 12/1975 | Der Marderosian et al. | 83/5 |
| 3,926,714 | 12/1975 | Der Marderosian et al. | 156/516 |
| 3,978,748 | 9/1976 | Leslie et al. | 83/53 |
| 3,985,848 | 10/1976 | Frische et al. | 264/88 |
| 4,007,652 | 2/1977 | Shinomiya et al. | 83/106 |

OTHER PUBLICATIONS

*New Fluid Jet Cutting System,* 1972, McCartney Manufacturing Company, Inc., Baxter Springs, Kansas.

*Primary Examiner*—John T. Goolkasian
*Assistant Examiner*—William H. Thrower
*Attorney, Agent, or Firm*—Glenn W. Ohlson; Robert H. Robertson; Kenneth E. Roberts

[57] ABSTRACT

Disclosed is a gypsum board having a kerfed edge along substantially the full length of at least one edge wherein the kerf has sidewalls inclined opposingly inwardly toward one another but do not intersect and are joined by a bottom surface of uneven profile characterized by alternately and irregularly spaced projections and depressions. The uneven bottom surface and each sidewall meet at a jagged intersection. Said kerfed edge provides enhanced strength in a direction perpendicular to the sidewalls providing improved board retention by flanged supports over that of conventional mechanically sawn kerfed edge boards. A process for providing kerfed edge gypsum board is also disclosed which comprises projecting into the board edge a first and second fine stream of aqueous liquid which incline toward one another at angles of incidence to a line perpendicular to the board edge which provides a combined angle therebetween of from about 3° to about 20°. Both first and second fine streams of aqueous liquid are projected at a pressure sufficient to cut to substantially the same depth of from about one-quarter to about three-quarter inches. The process is dustless and provides a kerf having two opposing sidewalls inclined toward one another and joined by a bottom uneven jagged surface providing increased strength exceeding that of boards kerfed by conventional mechanical sawing processes.

10 Claims, 5 Drawing Figures

KERFED EDGE GYPSUM BOARD HAVING IMPROVED EDGE STRENGTH

THE BACKGROUND OF THE INVENTION (1) Field of the Invention

This invention relates to kerfed gypsum board having improved strength along the kerfed edge, and relates to a process providing the kerfing.

(2) Description of the Prior Art

Kerfing boards or panels is not new to the construction industry. Accordingly, providing kerfed edge gypsum board for wall and ceiling construction is well established. In such panels, the kerfing comprises a slot running the length of the edges, usually two opposite edges, and provides an engageable conformation for some type of stud, clip, runner, or other flanged supportive device inserted within the kerf. These flanged supportive members are usually constructed from steel and other metal alloys which provide strength and rigidity to a wall or ceiling system. Edge strength is therefore desirable to provide secure retentive connections between the gypsum board and supporting structure.

Edge strengthening in kerfed gypsum board has been attempted in various manners. Generally, gypsum board panels having kerfed edges also have some type of hardening or strengthening agent localized in the kerfed outer edge portion. Such hardening or strengthening is widely known to the gypsum board industry and can be accomplished by numerous methods, such as addition of sugar solutions or other hardening materials along the outer edge portions during board formation at the manufacturing plant. Another method of strengthening kerfed edge board involves multiple layering wherein a gypsum core is covered along opposing faces by a metal or wood sheathing. In this construction the kerfing is most beneficially provided within the sheathing material rather than the gypsum core. Thin laminates, such as paper or plastic, are sometimes utilized as board coverings. With a thinner laminate the gypsum core is kerfed and the coating material adds some additional strength at the board edge.

In all the above-described typical kerfed edge gypsum board, kerfing is accomplished through mechanical sawing. Saw cutting involves circular saws contacting edges of board as the board moves down a conveyor or the like. The typical kerfing of gypsum board provides parallel sidewalls joined by a smooth bottom surface generally disposed at right angles to the sidewalls. When a wood panel or sheathing is specially kerfed a tongue-and-groove connection may be provided. In this manner the tongues and grooves have bevelled or inclined sidewalls which incline toward one another. This is provided by positioning the conventional circular saw apparatus to incline inwardly to cut these converging sidewalls. Other wood panel grooving can be done by planers or shapers well known to the woodworking art. The tongue and groove connection is directly panel-to-panel and no flanged support is utilized. Also, the groove bottom surface connecting the sidewalls is a flat plane.

Alterations of conventional mechanical sawing techniques have occurred in attempts to provide enhanced strength for the kerfed edge of gypsum board. The nature of saw cutting is such that it generates extreme vibration within the gypsum core and creates weakened fracture planes that erodes the strength of the gypsum attained during setting. Even though various alignments and positions for mechanical saw cutters have been tried, they generate deleterious side efforts. The addition of sugar solutions or other hardening additives to the board edge have aided in providing an edge which partially overcomes this weakening. However, it would be desirable to provide kerfed edge gypsum board having strength greater than that provided by conventionally saw cut edges, even where gypsum hardening chemicals have been administered to the conventionally saw kerfed edge.

The building construction industry uses kerfed gypsum board multifariously. Many wall and ceiling designs require demountability to provide accessible and replaceable panel elements in these systems. The need for strength along the kerfed edges of these boards is clear. Because the supportive members are generally rigid and are typically comprised of steel or other metal alloy, much abuse is given to the board edge in sustaining these demountable attachments. Providing enhanced edge strength has been an industry-wide, long felt need.

The conventional mechanical saw cutting of kerfs for gypsum board also creates considerable dust problems at the manufacturing plant. It prohibits doing a desirable preliminary step of predecorating the gypsum board prior to cutting. Typical coatings are plastics such as rigid, or plasticized, polyvinyl chloride film and polyethylene film. Prefinished gypsum board panels may not be cleanly kerfed due to the static electric clinging of finely comminuted gypsum produced by the saw cut. It is therefore desirable that a prefinished gypsum board undergo kerfing without the need for either cleaning the panel, or providing the film overlay at a later stage.

The industry has a long felt need for a gypsum board having enhanced kerfed edge strength for utilization with kerf engaging flanged supports. A process to provide such strength has been sought as well. Additionally, it has been an industry-wide need to provide a dustless process to allow for prefinishing, with plastic coating or the like, of gypsum board prior to kerfing the edge.

(3) Objects of the Invention

It is a primary object of this invention to provide a gypsum board having at least one kerfed edge which provides improved strength for retention by flanged support members at the kerfed portions.

It is also a major object of this invention to provide a process for kerfing gypsum board which provides improved edge strength at the kerfed portion.

It is further an additional object of this invention to provide a dustless kerfing process for gypsum board.

It is also an object of this invention to provide a process which allows the prefinishing of a gypsum board, with plastic coating or the like, prior to the kerfing step.

It is an additional object of this invention to simultaneously kerf two opposite edges of a gypum board.

It is an important object of this invention to provide a kerfed edge gypsum board whereby the kerf is cut by a pair of pressurized streams of aqueous liquid inclined inwardly toward one another into the edge of the gypsum board at a pressure sufficient to cut to a depth of from about one-quarter inch to about three-quarters inches.

A related object of this invention is to provide a kerfed edge gypsum board having a kerf with inclined sidewalls inclined toward one another but do not intersect and are joined by an uneven jagged bottom surface which is the characterizing effect created by the application of a pair of pressurized streams of aqueous liquid projected into the board edge.

A concomitant objective of this invention is to provide gypsum board having a thickness of from about one-half inch to about one inch with increased edge strength along kerfed portions thereof.

SUMMARY OF THE INVENTION

In accordance with this invention, an improved kerfed edge gypsum board is provided. The gypsum board has a front and back face terminating in edges wherein at least one of said edges has a kerf engageable with flanged supports. The kerf is disposed generally centered between the front and back faces and extends into the board along substantially the full length of the edge. The kerf has opposing sidewalls and a bottom surface. The improving features of this kerfed edge gypsum board provides a kerf cut by a pair of pressurized streams of aqueous liquid and comprises sidewalls inclined opposingly inwardly toward one another from the board edge, but which do not interest. These sidewalls are joined by the bottom surface. In attaining the objectives of this invention, the bottom surface is of an uneven jagged profile characterized by alternately and irregularly spaced projections and depressions both longitudinal of, and transverse to, the board edge. The bottom surface meets each sidewall at a jagged intersection. Enhanced edge strength is provided by this invention in a direction generally perpendicular to the sidewalls providing improved board retention by flanged supports beyond that provided by conventional mechanically sawn kerfed edge boards.

Pursuant to this invention the improved board is provided at a thickness of from one-half inch to one inch. Also in attaining the objectives of this invention, the kerf has a depth—measured from the board edge to an average depth of the projections of the uneven jagged bottom surface—of from about one-quarter inch to about three-quarter inches. Also, the sidewalls incline toward one another defining therebetween an angle from about 3° to 20°.

Also in attaining the objects of this invention, the improved board is provided with opposite edges of the board having engageable kerfs. Additionally, it is provided that the board is plastic coated.

A dustless process is provided for making the improved gypsum board having enhanced edge strength. The process comprises a first step of moving gypsum board rectilinearly at a constant speed. Next the process provides projecting a first fine stream of an aqueous liquid into at least one edge of the moving gypsum board at an angle of incidence to a line perpendicular to the board edge from 0° to no greater than 20°. The fine stream is provided at a pressure sufficient to cut to a depth of from about one-quarter inch to three-quarter inches. Following, a second fine stream of an aqueous liquid is provided projecting into the edge of said gypsum board at an angle inclined toward the angle of the first stream and having an angle of incidence to a line perpendicular to the board edge which provides a combined angle between the first and second streams of from about 3° to about 20°. The angle of incidence of the second stream may be 0° provided of course that the first stream angle of incidence is at least 3°. The pressure of the second stream is sufficient to cut to a depth substantially the same as the depth cut by the first stream of from about one-quarter inch to three-quarter inches. In completing the process a step is provided for removing away from the kerf the prismatic, or wedge-like, portion of the board cut by the streams and leaving a bottom uneven jagged surface. The process which attains the objectives of this invention provides a kerf having two opposing sidewalls inclined toward one another and joined by bottom uneven jagged surface. The process further completes the objectives of the invention by providing a gypsum board having increased edge strength exceeding that of gypsum boards kerfed by conventional mechanical sawing.

The dustless process provided by this invention also includes the simultaneous kerfing of two opposite edges of a gypsum board. Additionally, the invention includes providing the above process for kerfing gypsum board which is prefinished with a plastic coating, or the like.

BRIEF DESCRIPTION OF THE DRAWINGS

Other objects and advantages of the present invention will become apparent upon reading the following detailed description and upon reference to the drawings, in which.

DESCRIPTION OF THE PREFERRED EMBODIMENTS

This invention may be more fully described, but is not limited, by reference to the attached drawings and the following description of the preferred embodiments discussed hereinafter.

Figure 1:
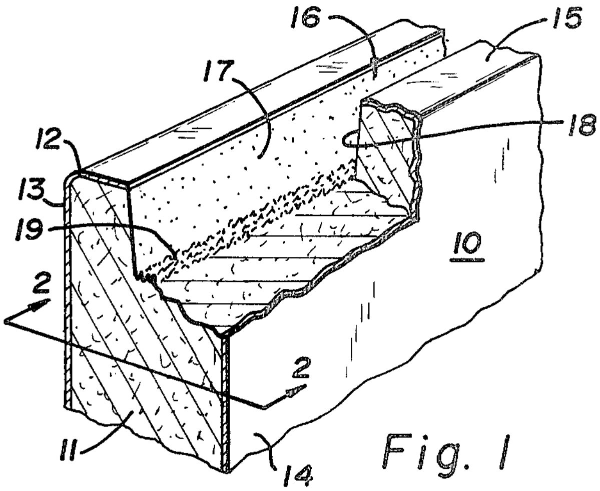
FIG. 1 is a perspective view of a portion of the kerfed edge gypsum board of this invention partially broken away to expose the kerf.

FIG. 1 shows a perspective view of a portion of a gypsum board 10 partially broken away. Gypsum board 10 is composed of a gypsum core 11 encased in coating 12 which is preferably a conventional paper covering with a plastic film overlay that is adhered to the board prior to kerfing operations.

Gypsum board 10 has opposing board faces 13 and 14 with board edge 15 therebetween. The thickness of gypsum board 10 may vary in accordance with this invention and is generally provided in thicknesses of from one-half inch to one inch with one-eighth inch incremental sizes.

A kerf 16 is provided in board edge 15 and has sidewalls 17 and 18. Sidewalls 17 and 18 inclined toward one another from board edge 15 but do not intersect. A bottom surface 19 connects sidewalls 17 and 18. Pursuant to the preferred embodiment of this invention bottom surfaces 19 is of an uneven jagged conformation characterized by alternately and irregularly spaced projections and depressions both longitudinal of, and transverse to, board edge 15. This may be described as a saw-toothed profile. There is no continuous straight line of intersection between either of sidewalls 17 and 18 with bottom surface 19, but instead bottom surface 19 meets both sidewalls 17 and 18 at a jagged intersection. The bottom surface 19 is produced due to the effects of kerfing with a pressurized stream or jet of aqueous liquid. Unlike conventional mechanical saw cutting, a smooth bottom surface is not provided.

Figure 2:
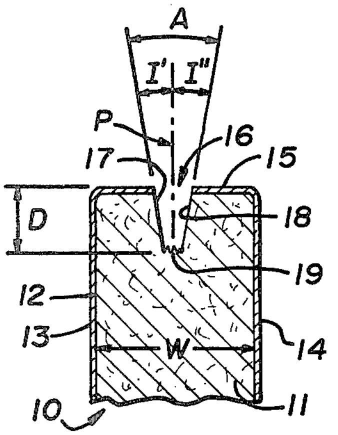
FIG. 2 is a cross-sectional view taken along line 2—2 of FIG. 1 looking in the direction of the arrows.

Turning now to FIG. 2, a cross-section of gypsum board 10 is illustrated taken along 2—2 of FIG. 1 looking in the direction of the arrows. Kerf 16 is shown to have a depth D. The depth D is provided to accommodate the flanged portions of support members widely known to the construction art such as flanged studs having H or L shapes, inverted-T runners, and the like. Depth D is preferably provided in the range of from one-quarter inch to three-quarters inch which accommodates the typical insertion depths of flanged supports. As discussed, the width W of the gypsum core 11 is generally of from about one-half inch to one inch.

Angle A, connoted in FIG. 2, illustrates the combined angle which is defined between sidewalls 17 and 18 as they incline toward one another. In providing improved edge strength, combined angle A is preferably from about 3° to about 20°. Combined angle A is the sum of the angles of incidence I′ and I″. Angle of incidence I′ represents the angular difference that sidewall 17 has with respect to imaginary line P, a line perpendicular to board edge 15. Inclined towards sidewall 17, sidewall 18 has an angle of incidence I″ which represents the angular difference that sidewall 18 has with respect to imaginary line P. In the preferred embodiments, angles of incidence I′ and I″ are equal and are correspondingly provided within the range of from about $1\frac{1}{2}$° to 10°. In accordance with this invention, however, angle of incidence I′ may differ from angle of incidence I″. It is preferable that the sum of these angles of incidence, combined angle A, define an angle of from about 3° to about 20°. The minimum value of about 3° allows for the simple removal of the prismatic or wedge-like portion of the gypsum core 11 which is cut out to provide kerf 16. Less than this minimum hinders the simple falling or washing-out that occurs as gypsum board 10 is kerfed by pressurized streams of aqueous liquid. The maximum value of about 20° is a strength and geometric limitation, above which, the unkerfed remaining portion of board edge 15 would be insufficient to avoid damage during handling and installation. This limitation corresponds to the desired depth D of from about one-quarter inch to three-quarter inches of engagement with conventional flanged support members and utilizing the preferred width W in the range of from about one-half inch to one inch.

Sidewalls 17 and 18 preferably incline toward one another inwardly from boad edge 15. Either sidewall may be provided at 0° angular difference with line P but of course the other sidewall must incline inwardly to provide a combined angle A of about at least 3°. Neither sidewall 17 or 18 inclines outwardly from board edge 15. It is preferable that kerf 16 be centrally located in edge 15 between opposite board faces 13 and 14. Therefore, bottom surface 19 is envisioned as residing equidistant from opposite board faces 13 and 14. This conformation is preferred so that flanged supports may engage boards, which are kerfed in accordance with this invention, in a uniform manner.

Depth D, noted in FIG. 2, is measured from the board edge 15 to the average depth of the peaks, also referred to as projections, of the uneven jagged bottom surface 19. In providing gypsum board 10 with the kerf 16 as described, it has been found that the average variance of the peaks and valleys created by pressurized jet kerfing may range from 1/64 inch to 1/16 inch. Therefore, it has been discovered that the measurement of the average depth D as disclosed, provides reliable exactness for utilization in the industry. When a particular depth D is required by a specified flange of a support member, the measurement as described for this depth D provides the necessary dimension required for snug retentive engagement.

Figure 3:
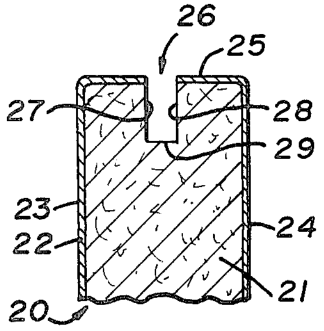
FIG. 3 is a cross-sectional view of a gypsum board edge having a conventionally saw cut kerf.

FIG. 3 shows a conventional gypsum board 20 which has been kerfed by conventional mechanical saw cutting. Gypsum board 20 has a gypsum core 21 with a coating 22 covering it. Board face 23 is opposite board face 24 with edge 25 therebetween. Edge 25 has a conventional kerf 26 centrally positioned therein and having sidewalls 27 and 28. A bottom surface 29 connects sidewalls 27 and 28. In comparison with gypsum board 10 of FIGS. 1 and 2, it is seen that the sidewalls 27 and 28 of gypsum board 20 are provided perpendicular to board edge 25. They are joined by a bottom surface 29 that is flat, smooth and extends generally at right angles between the sidewalls. There is no combined angle of incidence since both sidewalls 27 and 28 reside in generally parallel planar relationship having no angle, of course, therebetween. The angle of incidence for each sidewall is typically 0° since normally mechanical saw cutting is provided at right angles to board edge 25 and produces flat parallel planar sidewalls connected interiorly by a flat bottom surface disposed at right angles.

Figure 4:
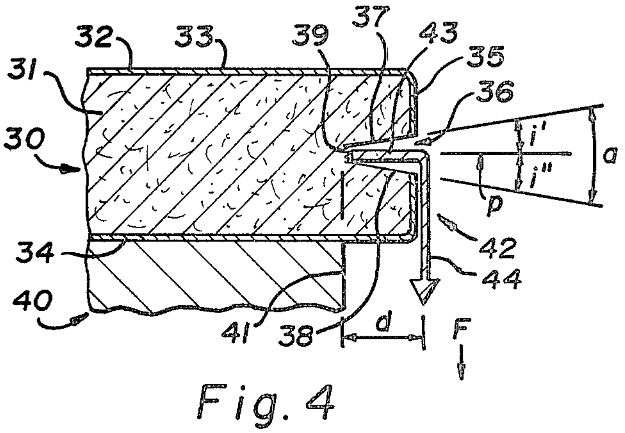
FIG. 4 is a cross-sectional view illustrating a test procedure which was performed to illustrate the improved edge strength of the kerfed edge gypsum board of this invention.

FIG. 4 illustrates a test procedure which was performed to determine the relative edge strength of a conventional mechanically sawn kerf and a kerf cut by a pair of pressurized streams of aqueous liquid. A gypsum board 30 was the subject of this test. Gypsum board 30 comprised a gypsum core 31 having a coating 32 of conventional paper materials. Opposite faces 33 and 34 were connected by board edge 35. Conventional kerfing and kerfing in accordance with this invention were provided in various portions of gypsum board 30 to provide comparative test samples to illustrate the enhanced edge strength made possible by this new and unique invention.

FIG. 4 indicates kerf 36 having sidewalls 37 and 38 which incline toward one another. The combined angle a, defined between the sidewalls 37 and 38, is composed of angles of incidence i′ and i″ representing the individual respective angular differences that sidewalls 37 and 38 have with respect to line p, a line perpendicular to board edge 35. A portion of a gypsum board 30 was kerfed by mechanical saw cutting and another portion was kerfed by a pair of pressurized streams of aqueous liquid. The latter test portion was cut by the use of high pressure fluid jet cutters manufactured by McCartney Manufacturing Company, Inc., Baxter Springs, Kansas. The pressurized streams used had a thickness of a few thousandths of an inch. The stream pressure of about 40,000 pounds per square inch was utilized to cut kerf 36 to the required test depth d of one-half inch. A water soluble long chain polymer was included in the jet cutting to provide a fine cohesive stream with reduced turbulence to cut effectively. That portion of gypsum board 30 which was kerfed by conventional saws had a cross-sectional appearance similar to gypsum board 20 of FIG. 3 wherein the corresponding depth d was one-half inch measured from the outer edge to the bottom surface of the kerf. The kerfs cut for each had a depth d equal to one-half inch. Gypsum board 30 had a width w of three-quarters inch. Samples of the board were chosen from each type kerfing in five inch lengths. These samples were each cut into two five inch by two and one-half inch pieces. The samples which were kerfed by pressurized streams of aqueous liquid had sidewalls 37 and 38 inclined toward one another to define angle a therebetween of about 14°. Both sidewalls 37 and 38 had substantially the same angles of incidence—angles i' and i" were each about 7°. The mechanically sawn kerf had opposing sidewalls in parallel planar relationship connected by a smooth bottom surface as best illustrated by FIG. 3.

As shown in FIG. 4, an L-shaped metal hook 42 was utilized for the testing procedure. Metal hook 42 was composed of a flange 43 and leg 44. Metal hook 42 was used to provide a simulated flanged stud support engagement with kerfed edge board. Flange 43 was inserted into kerf 36 and extended therein about one-half inch. Leg 44 extended downwardly having a length of about two inches. A support base 40 was located beneath gypsum board 10 wherein an edge 41 was located directly below the bottom surface 39 of gypsum, board 30. A small receptacle was attached to metal hook 42 and loaded in one-tenth pound increments to increase downward force F until board edge failure occurred. The two random samples which were kerfed by pressurized streams of aqueous liquid failed at 20.5 pounds and 21.5 pounds. Failure occurred for the two randomly chosen samples of board having conventional mechanically sawn kerfs at 10.3 pounds and 10.0 pounds. The loading force F which the board kerfed by the pressurized streams of aqueous liquid withstood was about double the loading force F which was withstood by the board having a regular mechanically sawn kerf.

The average depth d shown for gypsum board 30 was measured at one-half inch in both the conventionally kerfed portion and the portion kerfed by pressurized streams of aqueous liquid. In the latter case, this depth d was measured from board edge 35 inwardly to the average depth of the projections of the uneven bottom surface 39. Bottom surface 39 had alternately and irregularly spaced projections and depressions both longitudinal of, and transverse to, the board edge 35. The regularly sawed kerf had a smooth bottom surface similar to bottom surface 29 shown in FIG. 3 created when mechanical sawing techniques are utilized. The depth d for the conventionally kerfed portion was also one-half inch as measured from the board edge to the flat bottom surface similar to the relation of edge 25 to bottom surface 29 shown in FIG. 3. The improved strength of the gypsum board 30 having the kerfed edge in conformance with this invention was shown to provide improved edge strength and enhanced retentive properties for engaging flanged support members superior to the conventionally kerfed portion.

Figure 5:
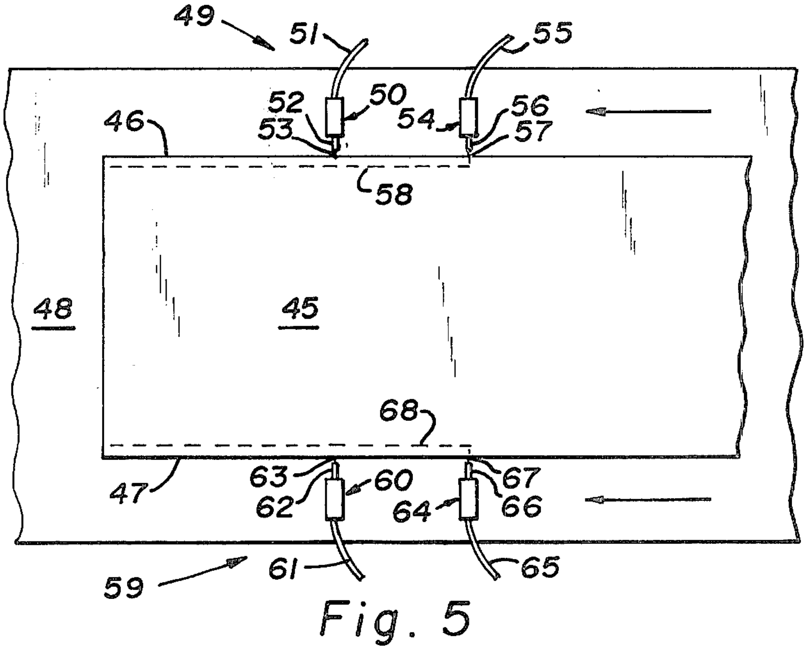
FIG. 5 is a top view illustrating the method for kerfing gypsum board in accordance with this invention.

Turning now to FIG. 5, the process for kerfing a gypsym board in accordance with this invention is shown. A gypsum board 45 having edges 46 and 47 is positioned on a conveyor 48 which moves rectilinearly at a constant speed. In the preferred embodiment edges 46 and 47 are simultaneously kerfed. It is of course within the purview of this invention that when both opposing edges of a gypsum board require kerfing one edge may be initially kerfed and then the board may be turned over for subsequent individual kerfing of the opposite edge.

The process disclosed by the preferred embodiment shown in FIG. 4 involves the use of conventional board handling and conveying equipment with the employment of pairs of jet cutters 49 and 59 where mechanical saw cutters have conventionally been positioned. The preferred embodiment envisions the use of high pressure fluid jet cutters such as those used for cutting the test sample depicted in FIG. 4 which are manufactured by McCartney Manufacturing Company, Inc., Baxter Springs Kansas. Such fluid jet cutters project streams of water under very high pressure in the range of from about 30,000 to about 60,000 pounds per square inch (psi). Nozzle orifices range from 0.002 inches to 0.015 inches. To maintain precision cutting and reduce turbulence the fineness of the stream is maintained by adding water soluble long-chain polymers, such as polyethylene oxide, to plain tap water. Other fluid jet cutters known to the industry to provide a high pressure streams of aqueous liquid are similarly usable with the process as illustrated in FIG. 5.

In FIG. 5 a first pair of cutters 49 are provided for cutting a kerf 58 in board edge 46. Cutters 49 comprise cutters 50 and 54. Cutter 50 has a hose 51 connecting it to a fluid pressurizing apparatus which emits, through nozzle 52, a high pressure fine stream 53. Similarly, cutter 54 has hose 55 and nozzle 56 projecting stream 57. At the opposite board edge 47, kerf 68 is simultaneously cut by a second pair of cutters 59 which are staggered similar to the spacing of the first pair of cutters 49. Positioning opposing cutters correspondingly across from one another is not necessary for this process and FIG. 5 merely illustrates one convenient alignment. Cutters 59 comprise cutter 60 and cutter 64. Cutter 60 has hose 61 and nozzle 62 projecting the high pressure fine stream 63. Cutter 64 has hose 65 and nozzle 66 projecting stream 67.

Cutters 50 and 54 are inclined inwardly to provide sidewalls for kerf 58 which incline inwardly and toward one another similar to the relation of sidewalls 17 and 18 of kerf 16 shown in FIG. 2. Similarly cutters 60 and 64 incline inwardly to produce sidewalls of kerf 68 which incline toward inwardly one another. In accordance with the preferred embodiment of this invention the first cutters, 50 and 60, of each pair project fine streams of aqueous liquid, 53 and 63 into the opposing board edges, 46 and 47 respectively, at an angle of incidence measured with respect to a line perpendicular to the board edges of from 0° to 20° at a pressure sufficient to cut to a depth of from about one-quarter inch to three-quarter inches. The second cutters, 54 and 64, of each pair project second fine streams of aqueous liquid, 57 and 67, into the opposite board edges, 46 and 47, respectively at an angle inclined toward the angle of the first streams. Both pairs of cutters, 49 and 59, provide a combined angle between the first and second streams of from 3° to 20°. One stream may have an angle of incidence of 0°, measured with respect to a line perpendicular to the board edge, if the other stream has an angle, measured the same way, of at least 3°, but no greater than 20°, to provide said combined angle preferred range. The second stream of each pair of cutters is provided at a pressure sufficient to cut to a depth substantially the same as the depth cut by its first stream in the range of from about one-quarter inch to three-quarters inch. Therefore, with regard to first pair of cutters 49, stream 53 first projects into board edge 46 at an angle of inclination. Then stream 57 is projected into edge 46 to define an angle between it and stream 53 of from about 3° to about 20°. Either stream may have a 0° angle measured with respect to a line perpendicular to board edge 46 if the other stream has an angle of at least 3° but no more than 20°. Or course one stream may have an angle between 0° and 3° if the other stream has an angle defining a combined angle between them of at least 3° but no more than 20°. The streams preferably angle inwardly with respect to the opposite board faces and toward one another. They preferably do not angle outwardly with respect to the board faces. In the same manner, streams 63 and 67 are directed at the opposite board edge 47 to provide an angle therebetween of from about 3° to about 20°. The pressures required to cut gypsum board kerfs from about one-quarter inch to three-quarter inches lie in the range of from about 30,000 psi to about 60,000 psi. The stream is projected from industry known fluid jet cutters is only a few thousandths of an inch thick (0.002 inches to 0.015 inches). Precision cutting is obtainable. The pressures charging cutters 50 and 54 to cut kerf 58 are equalized to provide equal cutting depths for the opposing sidewalls (not shown in FIG. 5) of kerf 58 as board 45 moves past the pair of cutters 49. In like manner, the pressures provided to cutters 60 and 64 are equalized to cut equal depths for the opposing sidewalls (not shown) of kerf 68 as board 45 moves past the pair of cutters 59.

The process shown in FIG. 5 is dustless as well as being relatively noiseless due to the nature of high pressure aqueous liquid cutting. Therefore, gypsum board 45 may be pre-decorated with a plastic film, such as rigid, or plasticized, polyvinyl chloride or polyethylene, since no gypsum dust is created which would adhere to this coating. The plastic film may be applied to conventional paper coated gypsum board. Also, the paper covering may itself be suited to a particular need and no plastic film need be applied. Additionally, a plain uncovered gypsum board may be kerfed in accordance with this invention. In any event, dust is not created.

The process embodied in FIG. 5 utilizes a fluid jet cut with two streams directed toward the edge of the finished gypsum board 45 in converging but non-intersecting paths. This method specifically requires that the streams stop short of intersection which leaves a wedge, or prismatic portion, of the gypsym core between opposing inclined sidewalls. This remaining wedge is easily removed since it becomes loosened and usually washes out. Thus the converging cutting streams do not have to provide sidewalls that intersect to effectuate removal. The method leaves a maximum amount of mass in the edge of the board for strength and resistance to damage. Because of this feature, a reduction in board thickness may be considered. The wedge of gypsum board which remains following the use of pairs of cutters 49 and 59 normally crumbles and washes away but can be simply extricated if portions remain by placing a sharp stationary cutting tool at the desired depth to "plow out" with little, if any, resistance encountered.

The enhanced board edge strength has been demonstrated by the testing procedures outlined and illustrated in FIG. 5. The process provides precision cutting of gypsum board in a dustless ambience utilizing conventional board handling and conveying equipment with the substitution for mechanical saws with properly positioned fluid jet cutters. Kerfs 58 and 68 in FIG. 5 are, similar to kerf 16 illustrated in FIG. 2, located centrally between opposing board faces along respective board edges 46 and 47. Upon removal of the wedge shaped or prismatic portions, a bottom surface remains having projections and depressions irregularly spaced both longitudinal of, and transverse to, the board edges. This uneven surface connects opposing sidewalls as discussed above with regard to FIG. 2, and said bottom surface meets each sidewall at a jagged intersection.

While only the preferred embodiments of this invention have been shown and described, other forms and embodiments within the spirit and scope of the invention will become apparent to those skilled in the art. Therefore, the embodiments shown in the drawings are to be considered as merely setting forth the invention for descriptive purposes and are not intended to limit the scope of the invention here described and shown.

What is claimed is:

1. In a gypsum board having front and back faces terminating in edges, at least one of said edges having a kerf engageable with flanged supports, said kerf being disposed between said front and back faces and extending into the board along substantially the full length of said board, the kerf having opposing sidewalls and bottom surfaces:

the improvement wherein the kerf is cut by a pair of pressurized streams of aqueous liquid to form sidewalls inclined opposingly inwardly toward one another from said board edges, but do not intersect;

wherein said sidewalls incline inwardly toward one another defining therebetween an angle of from about 3° to about 20°;

wherein said sidewalls meet the bottom surface and are joined by said bottom surface;

wherein said bottom surface is of an uneven jagged profile characterized by alternately and irregularly spaced projections and depressions both longitudinal of and transverse to the board edge wherein said bottom surface meets each sidewall at a jagged intersection;

whereby the portions of said board defining said kerfed edge have enhanced strength in a direction generally perpendicular to the sidewalls to provide improved board retention by flanged supports over conventional mechanically sawn kerfed edge board of similar dimensions.

2. The improved panel as defined in claim 1, wherein said gypsum board has a thickness of from about one-half inch to about one inch.

3. The improved board as defined in claim 1, wherein said kerf has a depth, measured from the board edge to an average depth of the projections of the uneven jagged bottom surface, of from about one-quarter inch to about three-quarter inches.

4. The improved board as defined in claim 1, wherein said sidewalls have substantially the same angle of inclination measured with respect to a line perpendicular to board edge.

5. The improved board as defined in claim 1, wherein said sidewalls have different angles of inclination measured with respect to a line perpendicular to the kerfed board edge.

6. The improved board as defined in claim 1, wherein opposite edges of said board have kerfs.

7. The improved board as defined in claim 6, wherein said board is plastic coated.

8. A dustless process for kerfing gypsum board, comprising the steps of:

moving gypsum board rectilinearly at a constant speed;

projecting a first fine stream of an aqueous liquid into at least one edge of the moving gypsum board at an angle of incidence to a line perpendicular to the board edge no greater than 20° at a pressure sufficient to cut to a depth of from about ¼ inch to about ¾ inches;

projecting a second fine stream of an aqueous liquid into the same edge of said gypsum board at an angle inclined inwardly toward the cut made by the first stream and having an angle of incidence to a line perpendicular to the board edge which provides a combined angle between the cuts made by the first and second streams of from about 3° to about 20°, said second stream being projected at a pressure sufficient to cut to a depth substantially the same as the depth cut by said first stream of from about ¼ inch to about ¾ inches;

removing away from the kerf the generally prismatic remaining edge portion of the board cut by said streams leaving a kerf having sidewalls joined by bottom uneven jagged surface;

whereby the kerf provided has two opposing sidewalls inclined inwardly toward one another and joined by the bottom uneven jagged surface providing a kerfed edge gypsum board having increased strength.

9. A dustless process for kerfing gypsum board as in claim 8, wherein said process includes kerfing simultaneously opposite edges of a gypsum board.

10. A dustless process for kerfing gypsum board as in claim 9, wherein said process includes kerfing gypsum board which is coated with a plastic film.

* * * * *